United States Patent
Aneros et al.

(10) Patent No.: US 9,453,785 B2
(45) Date of Patent: Sep. 27, 2016

(54) METHOD AND METHOD FOR TROUBLESHOOTING A BODY WORK FUNCTION PERTAINING TO VEHICLES

(71) Applicant: SCANIA CV AB, Södertälje (SE)

(72) Inventors: Johan Aneros, Hägersten (SE); Tony Lindgren, Vällingby (SE)

(73) Assignee: SCANIA CV AB (SE)

( * ) Notice: Subject to any disclaimer, the term of this patent is extended or adjusted under 35 U.S.C. 154(b) by 73 days.

(21) Appl. No.: 14/350,179

(22) PCT Filed: Oct. 3, 2012

(86) PCT No.: PCT/SE2012/051054
§ 371 (c)(1),
(2) Date: Apr. 7, 2014

(87) PCT Pub. No.: WO2013/051997
PCT Pub. Date: Apr. 11, 2013

(65) Prior Publication Data
US 2014/0288767 A1    Sep. 25, 2014

(30) Foreign Application Priority Data
Oct. 5, 2011  (SE) ...................................... 1150919

(51) Int. Cl.
*G01M 17/00*  (2006.01)
(52) U.S. Cl.
CPC .......... *G01M 17/00* (2013.01); *G07C 2205/02* (2013.01)
(58) Field of Classification Search
None
See application file for complete search history.

(56) References Cited

U.S. PATENT DOCUMENTS

| 7,057,394 | B1 | 6/2006 | Bell et al. | |
| 7,184,866 | B2 * | 2/2007 | Squires | A62C 27/00 340/426.15 |
| 7,522,979 | B2 * | 4/2009 | Pillar | G01M 17/00 340/438 |
| 8,527,135 | B2 * | 9/2013 | Lowrey | G01C 21/26 701/2 |

(Continued)

FOREIGN PATENT DOCUMENTS

| JP | 2005-104408 | 4/2005 |
| JP | 2009-293951 | 12/2009 |

OTHER PUBLICATIONS

International Search Report dated Feb. 26, 2013 issued in corresponding International patent application No. PCT/SE2012/051054.

(Continued)

*Primary Examiner* — Redhwan K Mawari
*Assistant Examiner* — Edward Torchinsky
(74) *Attorney, Agent, or Firm* — Ostrolenk Faber LLP

(57) ABSTRACT

A method for troubleshooting a built-on function pertaining to a manufactured vehicle. That vehicle undergoes building-on of at least one function, which function is provided with a computer-readable representation associated with the vehicle. During troubleshooting of the built-on function, the vehicle is connected to a diagnostic tool which determines conditions for activation of the built-on function. The tool determines via the connection to the vehicle whether the at least one condition for the activation is fulfilled, and a signal is generated if the at least one activation condition is not fulfilled. Also a diagnostic tool and a vehicle are disclosed.

22 Claims, 5 Drawing Sheets

(56) References Cited

U.S. PATENT DOCUMENTS

2004/0002794 A1 1/2004 Pillar et al.
2010/0188203 A1 7/2010 Wallace et al.
2011/0272975 A1* 11/2011 Hogg ...................... B60N 2/24
297/188.04

2012/0143518 A1 6/2012 Kim et al.

OTHER PUBLICATIONS

Korean Office Action mailed Mar. 15, 2016 in corresponding Korean Application No. 10-2014-7012170, along with an English translation of relevant portions thereof.

\* cited by examiner

METHOD AND METHOD FOR TROUBLESHOOTING A BODY WORK FUNCTION PERTAINING TO VEHICLES

CROSS-REFERENCE TO RELATED APPLICATIONS

The present application is a 35 U.S.C. §§371 national phase conversion of PCT/SE2012/051054, filed Oct. 3, 2012, which claims priority of Swedish Patent Application No. 1150919-7, filed Oct. 5, 2011, the contents of which are incorporated by reference herein. The PCT International Application was published in the English language.

FIELD OF THE INVENTION

The present invention relates to vehicles produced by a vehicle manufacturer with a view to subsequent building-on of further functionalities. The present invention relates in particular to a method and a system for troubleshooting a built-on function pertaining to such a vehicle. The present invention relates also to a vehicle, and to a computer program and a computer program product, which implement the method according to the invention.

BACKGROUND TO THE INVENTION

Vehicle manufacture may be conducted in a variety of ways. In for example the car industry the manufacturer usually produces vehicles which are complete and intended for direct delivery to final customers.

The heavy vehicle industry, however, commonly also employs other kinds of production methods. Manufacturers of heavy vehicles may, as in the car industry, produce vehicles intended for delivery directly to final customers or the vehicle's final user, but it is also very common that vehicles produced by the manufacturer are only completed to a certain extent, with a view to being subsequently completed by a customer of the manufacturer, e.g. a third party supplier, in such a way as to meet specific requirements. It may also be that the vehicle, although substantially completed by its manufacturer, will be provided with further functionalities, e.g. by another party such as a third party supplier or final user, before it is put into use.

It is for example usual that commercial vehicle manufacturers, as well as producing fully equipped vehicles, produce also versions comprising only the chassis, or chassis and cab, with a view to subsequent completion by another party according to the latter's specific requirements.

For example, chassis produced by a vehicle manufacturer may be such as to be usable in any desired way as bases for building on in order to construct mobile homes, fire vehicles, ambulances, concrete mixer trucks, refrigerated vehicles etc.

Moreover, a bus chassis for example may be produced by the vehicle manufacturer with little or no bodywork, with a view to subsequent building on by a bus bodybuilder.

Thus the building-on carried out by another party may be very extensive and at least some building-on is also very common in the case of heavy vehicles. For this reason, the vehicle manufacturer often also to a great extent prepares the vehicle in such a way as to facilitate subsequent building-on. For example, one or more power takeoffs (PTOs) are often provided, e.g. so that built-on elements can be connected to the vehicle's engine and/or gearbox to enable them to be provided with driving power from the vehicle. There may also be connections to make it possible to use, for example, the vehicle's electrical system, hydraulic system and/or pneumatic system for implementation of built-on functions.

A vehicle may thus be provided with a plurality of PTOs, and the power offtake requirement may vary depending on the kinds of applications built onto the vehicle. Certain applications may for example require power which is constantly available when the vehicle's engine is running, irrespective of whether the vehicle is moving or not, e.g. in the case of concrete mixer trucks, refrigeration units in refrigerated vehicles and plough systems. Other applications will only need power on distinct occasions, e.g. upon activation of a crane etc.

The activation of a PTO for, and hence the operation of, one or more built-on functions is often not such that continuous or unregulated power offtake is desirable, since it is only usually required in certain situations, upon demand from the built-on element itself or from, for example, the vehicle's driver.

As well as PTOs as such, it is therefore usual for the vehicle manufacturer to provide a building-on interface to enable communication between the vehicle's internal communication systems and the built-on element's control system. This interface may for example comprise one or more terminal blocks with a number of inputs/outputs such that high/low signals on an output may for example represent the status of a certain function, and this information may be used as a control signal for conditional control of built-on functions. There may also be inputs, e.g. for conveying from the built-on element's control system a demand for activation of a certain PTO, in which case a high level may for example indicate a demand for activation and a certain input may have a defined meaning.

As a given chassis configuration may be used for built-on elements within a large number of areas of application, it is often not possible at the vehicle manufacturing stage to know the specific intended use of a specific chassis, still less the characteristics of specific build-on elements, e.g. a specific crane unit or a specific plough system.

Thus built-on functions may communicate their status, e.g. whether the function is active or inactive, by applying a voltage to an input on the interface to the vehicle's internal control system. The vehicle's internal communication system will thus also be aware that built-on functions exist and their status by the built-on function signalling a demand for activation of some vehicle function and/or demanding power.

SUMMARY OF THE INVENTION

An object of the present invention is to propose a method for diagnosis of a built-on function pertaining to a vehicle.

The present invention proposes a method for troubleshooting a built-on function pertaining to a vehicle which, after being produced by a manufacturer, has at least one function built onto it. Said building-on involves a computer-readable representation of said built-on function being associated with said vehicle. For troubleshooting of said built-on function, said vehicle is connected to a diagnostic tool which uses said computer-readable representation of said built-on function as a basis for determining conditions for activation of said built-on function. Said diagnostic tool determines via said connection to said vehicle whether said at least one condition for activation of said built-on function is fulfilled, and a signal is generated if said at least one activation condition is not fulfilled.

Built-on elements are often very difficult to troubleshoot because there is often a lack of information about them in the vehicle or at the workshop. This and the fact that the vehicle is delivered with a building-on interface which may be used in substantially any desired way at build-on stage means that an element may be built on in substantially any desired way so long as the desired function is achieved. All in all, this means that troubleshooting a malfunctioning built-on element may be very time-consuming. The present invention solves such problems by ensuring that, at build-on stage, a computer-readable representation of said built-on function is associated with said vehicle. This representation may subsequently be used by a diagnostic tool which via a connection to the vehicle in real time reads prevailing signal states on board the vehicle, making it possible for reasons why a desired function does not happen when using the built-on element to be identified by the diagnostic tool, thereby considerably reducing time spent on troubleshooting.

Further characteristics of the present invention and advantages thereof are indicated by the detailed description of embodiment examples set out below and the attached drawings.

DETAILED DESCRIPTION OF EMBODIMENTS

The expression "other party" in the present description and claims means a party which is independent of a vehicle manufacturer and to which a vehicle produced by the vehicle manufacturer is delivered. Thus said other party may be a final user but may also be a third party supplier which carries out building-on before delivery to a final customer.

Figure 1A:
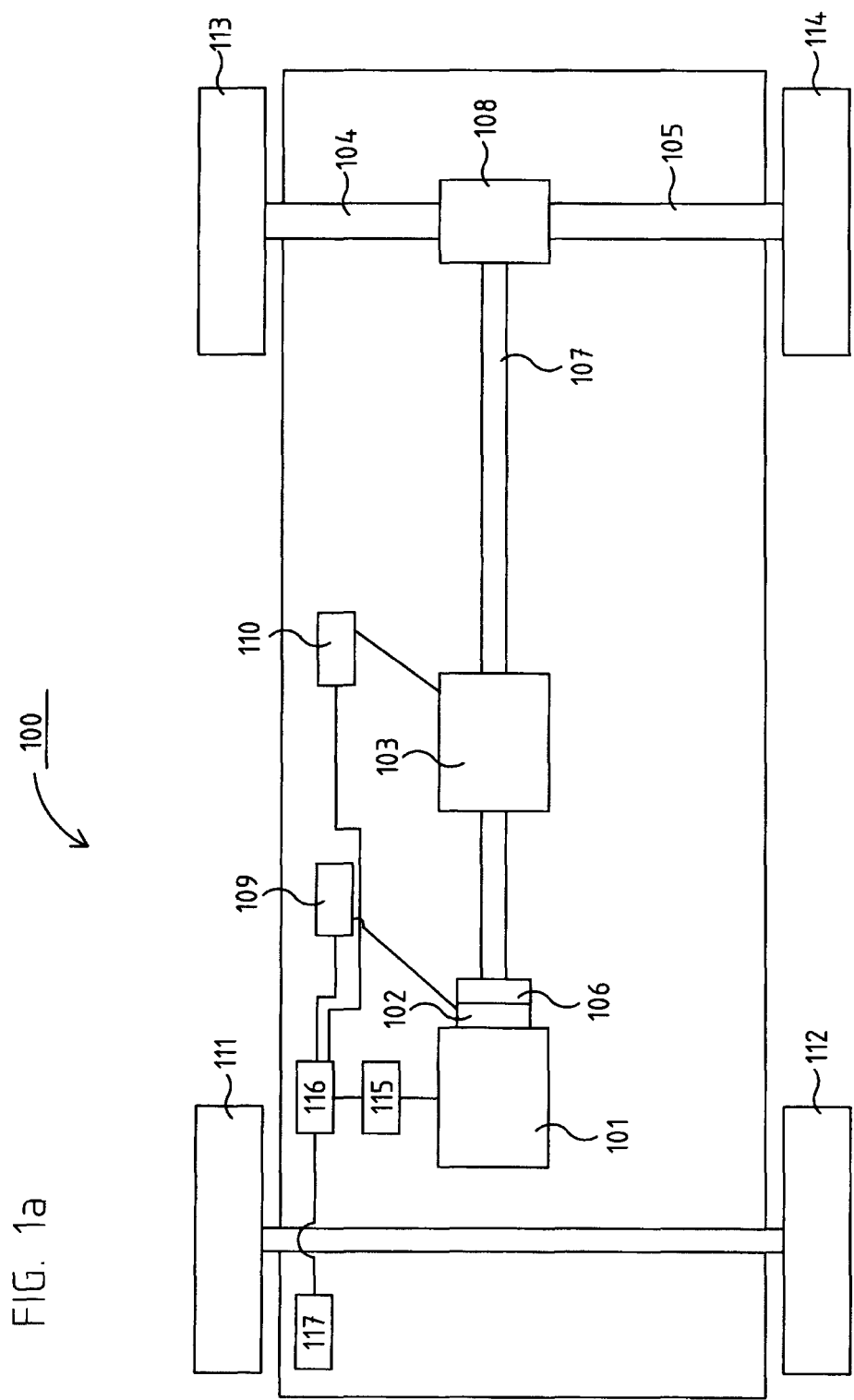
FIG. 1A depicts schematically a vehicle on which the present invention may be employed.

FIG. 1A depicts schematically a power train in a vehicle 100 according to an embodiment of the present invention. The vehicle depicted has only one axle with tractive wheels 113, 114 but the invention is also applicable to vehicles which have more than one axle provided with tractive wheels. The power train comprises a combustion engine 101 which in a conventional way, via an output shaft of the engine, usually via a flywheel 102, is connected to a gearbox 103 via a clutch 106. The engine is controlled by the vehicle's control system via a control unit 115. The vehicle's control system also controls the clutch 106, which may for example take the form of an automatically controlled clutch, and the gearbox 103 by means of one or more suitable control units (not depicted). The power train may of course also be of some other kind, e.g. with conventional automatic gearbox etc.

An output shaft 107 from the gearbox 103 drives the tractive wheels 113, 114 via a final gear 108, e.g. a conventional differential, and driveshafts 104, 105 which are connected to said final gear.

It should be noted that the vehicle depicted is merely one example of how it might be configured, as the invention is applicable to all types of vehicles, e.g. those with hybrid power trains, electric vehicles and/or other kinds of axle configurations, other types of gearboxes with or without clutches etc.

The vehicle depicted is further provided with power takeoffs (PTOs) 109, 110, the PTO 109 being a direct power takeoff via the engine's flywheel 102, whereas the PTO 110 takes power via the vehicle's gearbox 103. PTOs may thus be situated at various locations in the vehicle structure and power may for example be taken directly from the engine or from the gearbox, in which case it will be clutch-dependent. Power offtake from the gearbox, e.g. via the PTO 110, affords the advantage that relatively high powers can be taken, but suffer at the same time the disadvantage of only being possible when the clutch engages.

Built-on elements such as cranes etc. may be connected to, and hence driven by, suitable PTOs. It should be noted that the vehicle may have more PTOs than the PTOs 109, 110, and may also have PTOs of other kinds.

Built-on functions may however be of very different kinds, e.g. one might comprise activation of a crane function via a power offtake demand, whereas another might comprise a demand for illumination of a certain warning lamp at the vehicle driver's location. Thus built-on functions may be of a simple kind, in which case the interaction with the vehicle's internal control system need not involve any demand for power, but substantially any desired functionality may be demanded via a building-on interface as described below. Nor need the built-on element's control system be such as to demand resources from the vehicle, as it may instead depend entirely on status signals from the vehicle, i.e. the signal state of appropriate outputs on the building-on interface.

The resource which built-on functions demand for their function may thus for example take the form of one or more among mechanical power, electric power, hydraulic power or pneumatic power or a demand for some function via the vehicle's control system. Where resources are demanded, they are normally not, nor normally desired to be, constantly available, but activation as necessary is usually desired.

The description below exemplifies a built-on function for which torque-limited power offtake is demanded. As PTOs belong to the vehicle, they are usually controlled/activated by suitable signals from the vehicle's internal control system. In the embodiment depicted, their activation is controlled by the control unit 116.

This also means that for it to be possible for these PTOs to be activated, particularly when needed for a specific built-on element, the latter has to communicate with the vehicle's internal control system.

Vehicle manufacturers are reluctant for some other party, e.g. a third party supplier, to effect changes directly in a vehicle's internal control system, since this may affect the vehicle's performance in ways which are both undesirable and difficult to predict. This is also why the vehicle manufacturer usually provides a signalling interface which can be used for communication with the vehicle's internal control system. This is depicted schematically in FIG. 1A in the form of the built-on element's control unit 117 which communicates with, for example, the control unit 116 and/or other control units on board the vehicle.

The building-on interface may be of various kinds but comprises usually a built-on element's control unit with a number of inputs/outputs which each have a certain function. One output might for example represent the vehicle's parking brake, and when the parking brake is applied this output might for example be set to a high level by the vehicle's internal control system in order thereby to communicate this to the built-on element. Other examples of functions whose status may be signalled in a similar way comprise gearbox in neutral, engine started and the status of other functions/parts of, for example, the vehicle's power train, various brake systems etc. These signals may then be used by the built-on element's control system, but subject for example to various conditions which usually have to be fulfilled for a certain function to be activated. For example, for the built-on function to demand activation of, for example, a certain PTO and hence for example the running of a built-on function, it may be necessary for various conditions to be fulfilled, e.g. both that the parking brake be applied and that at the same time the vehicle's gearbox be in neutral. If these conditions are fulfilled, which the built-on element's control system can read from the respective output on the control unit 117, activation may be demanded. This activation may be demanded via said built-on element's control unit 117, which may as above be provided with inputs which each have a certain meaning, e.g. demand for activation of a certain PTO, which demand may be converted by the built-on element's control unit 117 to a suitable format for communication with the control unit 116.

Control systems in modern vehicles usually comprise a communication bus system consisting of one or more communication buses for connecting together a number of electronic control units (ECUs), e.g. the control units, or controllers, and various components on board the vehicle. Such a control system may comprise a large number of control units and the responsibility for a specific function may be spread over more than one of them.

For sake of simplicity, FIG. 1A shows only the control units 115, 116, 117.

Parts of the present invention may be implemented in any suitable control unit, e.g. the control unit 117, or wholly or partly in one or more other control units on board the vehicle.

Control units of the kind depicted are normally adapted to receiving sensor signals from various parts of the vehicle. The control unit 116 may for example receive signals from the control unit 117 when determining whether a PTO is to be activated or not. Control units of the kind depicted are also usually adapted to delivering control signals to various parts and components of the vehicle, e.g. the control unit 116 may deliver signals to suitable actuators for activation of PTOs etc.

The function of the control units is often governed by programmed instructions, typically in the form of a computer program which, when executed in a computer or control unit, causes the computer/control unit to effect desired forms of control action, e.g. method steps according to the present invention. The computer program usually takes the form of a computer program product 109 which is stored on a digital storage medium 121 (see FIG. 1B), e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. The vehicle's behaviour in a specific situation is therefore modifiable by altering the computer program's instructions.

Figure 1B:
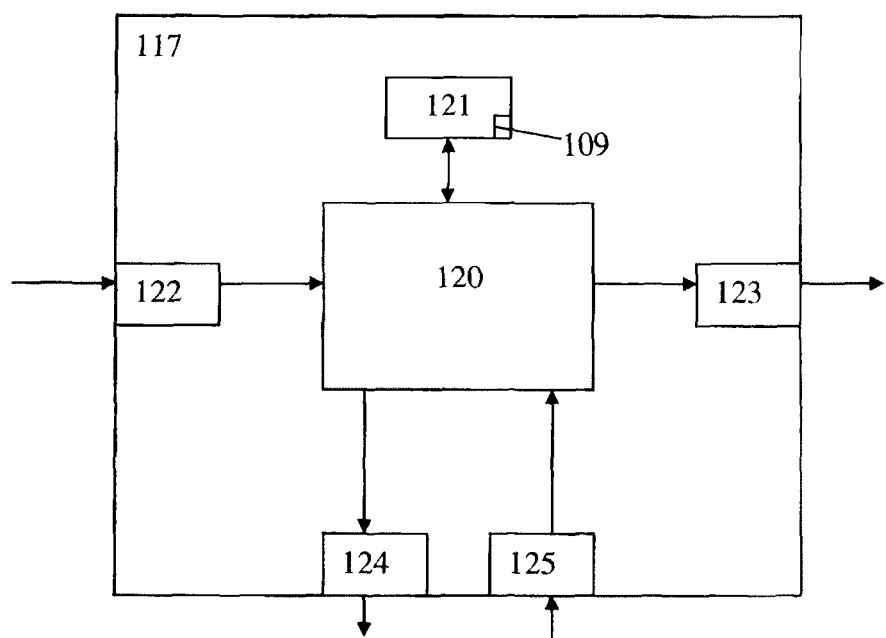
FIG. 1B depicts a control unit in the control system of the vehicle depicted in FIG. 1A.

An example of a control unit (the built-on element's control unit 117) is depicted schematically in FIG. 1B, possibly comprising a calculation unit 120 which may for example take the form of some suitable kind of processor or microcomputer, e.g. a circuit for digital signal processing (Digital Signal Processor, DSP), or a circuit with a predetermined specific function (Application Specific Integrated Circuit, ASIC). The calculation unit is connected to a memory unit 121 which provides it with, for example, the stored program code 109 and/or the stored data which it needs to enable it to perform calculations. The calculation unit is also arranged to store partial or final results of calculations in the memory unit 121.

The control unit is further provided with respective devices 122, 123, 124, 125 for receiving and sending input and output signals. These input and output signals may comprise waveforms, pulses or other attributes which the input signal receiving devices 122, 125 can detect as information and which may be converted to signals which the calculation unit 120 can process. These signals are therefore conveyed to the calculation unit. For example, the built-on element's control unit may have inputs to receive signals from, for example, circuit-breakers pertaining to a built-on unit. The output signal sending devices 123, 124 are arranged to convert signals received from the calculation unit in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, an MOST (Media Orientated Systems Transport) bus or some other bus configuration, or a wireless connection.

Figure 2:
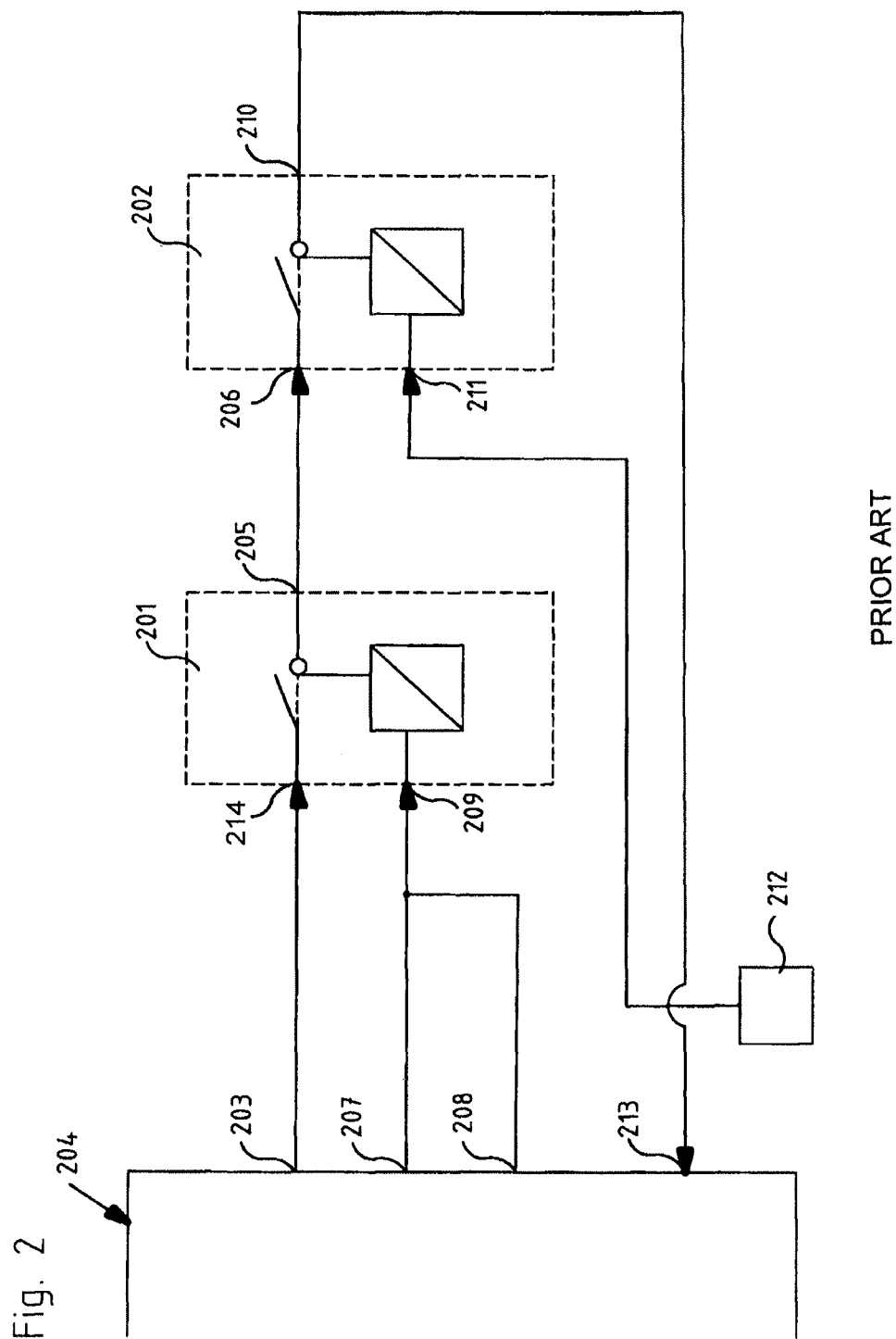
FIG. 2 depicts an example of a built-on function pertaining to a vehicle.

Control systems for vehicles may thus be very extensive with a large number of control units, whereas control systems for built-on functions may in principle be of a very simple kind and be for example implemented as depicted in FIG. 2.

FIG. 2 depicts schematically part of a control system for a simple built-on function according to the state of the art. The example depicted relates to a demand for activation of torque-limited power offtake, e.g. via the PTO 109 in FIG. 1A, when stated criteria are fulfilled. The solution depicted is constructed in the form of a relay solution whereby various signals are connected together by relays 201, 202 to demand activation of power offtake when desired conditions are fulfilled. In the example depicted, a first relay 201 at a first input 214 receives a first signal from an output 203 of a built-on element's control unit 204 as in prior art. This signal takes the form of a neutral-gear signal which is set to active by the vehicle's internal control system when neutral gear is engaged.

For the first relay 201 to close and thereby pass on the neutral-gear signal via its output 205 to the input 206 of the relay 202, it is necessary for either a parking brake signal received from an output 207 of the built-on element's control unit 204, or a service brake signal received from an output 208, to assume a high level in order thereby to cause a high level on the control input 209 of the relay 201.

When the condition is fulfilled, the relay 201 closes, so the neutral-gear signal is passed on to the relay 202. For the relay 202 also to close and thereby deliver a high level on its output 210, its input 211 needs also to assume a high level, which takes place when a circuit-breaker 212 is activated. The circuit-breaker may for example be activated by the vehicle's driver or in some other suitable way when torque-limited power offtake via the PTO is to be active. When the circuit-breaker and hence also the relay 202 are closed, an input 213 on the built-on element's control unit 204 is set to a high level whereby this input represents said demand for torque-limited power offtake.

This demand is then converted by the built-on element's control unit 204 to a suitable signal in order, via the vehicle's internal control system, e.g. via the control unit 116 as above, to demand that the PTO 109 be activated as desired.

It should be noted that the example depicted in FIG. 2 is of a very simple function and that in practice substantially more complicated connection structures may be used in relation to built-on elements to achieve desired functions. Troubleshooting of malfunctions may nevertheless be very time-consuming even in the relatively simple system in FIG. 2.

A vehicle with a built-on function as in FIG. 2 which visits a workshop because the built-on function is malfunctioning may give rise to complicated troubleshooting, particularly if the built-on function is implemented with a large number of components.

It is generally the case that electrical systems pertaining to built-on elements are very difficult to troubleshoot, since vehicle workshops often lack information about the specific built-on element which the vehicle is equipped with. As the vehicle is delivered with a building-on interface which can be used in substantially any desired way at building-on stage, similar functionalities may also be implemented in many different ways, nor is there any certainty that two vehicles with built-on units from the same party are implemented in exactly the same way.

If a built-on function, e.g. that depicted in FIG. 2, malfunctions, there is no possibility of the workshop diagnosing it without its mechanics having to carry out measurements on the electrical system as a way of trying to identify the fault. For this to be possible at all within a reasonable amount of time, a further requirement is the availability of a circuit diagram of the built-on element showing how the function actually works. Unfortunately, such diagrams are often lacking, which means that troubleshooting may be very time-consuming.

Reverting to FIG. 2, even in this simple example it is for example possible that the following faults/causes of activation not taking place may occur:
 parking brake signal or service brake signal not active;
 neutral-position signal not active;
 no signal from circuit-breaker 212;
 cabling for some incoming signal out of action;
 one or more relays 201, 202 out of action;
 internal fault in built-on element's control unit 204;
 internal activation conditions for torque limiter function not fulfilled, i.e. non-fulfilment of the vehicle's internal conditions for allowing activation of the torque limiter.

Thus a large number of measurements may be necessary to identify a malfunction in even a relatively simple application. Moreover, access to the installation may often be difficult, making it difficult to carry out measurements between two points. It is also necessary to check that the vehicle's internal conditions for activation of demanded vehicle functions are fulfilled, e.g. by means of a diagnostic program.

The present invention proposes a method which substantially facilitates the troubleshooting of built-on solutions. The present invention is based on having a computer-readable function description, e.g. a program code with logic function description of the built-on function, stored at an appropriate location in the vehicle's control system, e.g. in the built-on element's control unit 117 in FIG. 1A or some other suitable control unit. This function description is then used by a diagnostic program to diagnose the function by the diagnostic program being hooked up to the vehicle in order in real time to be able to read the status of various signals and thereby identify unfulfilled activation conditions which may thus be potential causes of malfunctions.

Figure 3:
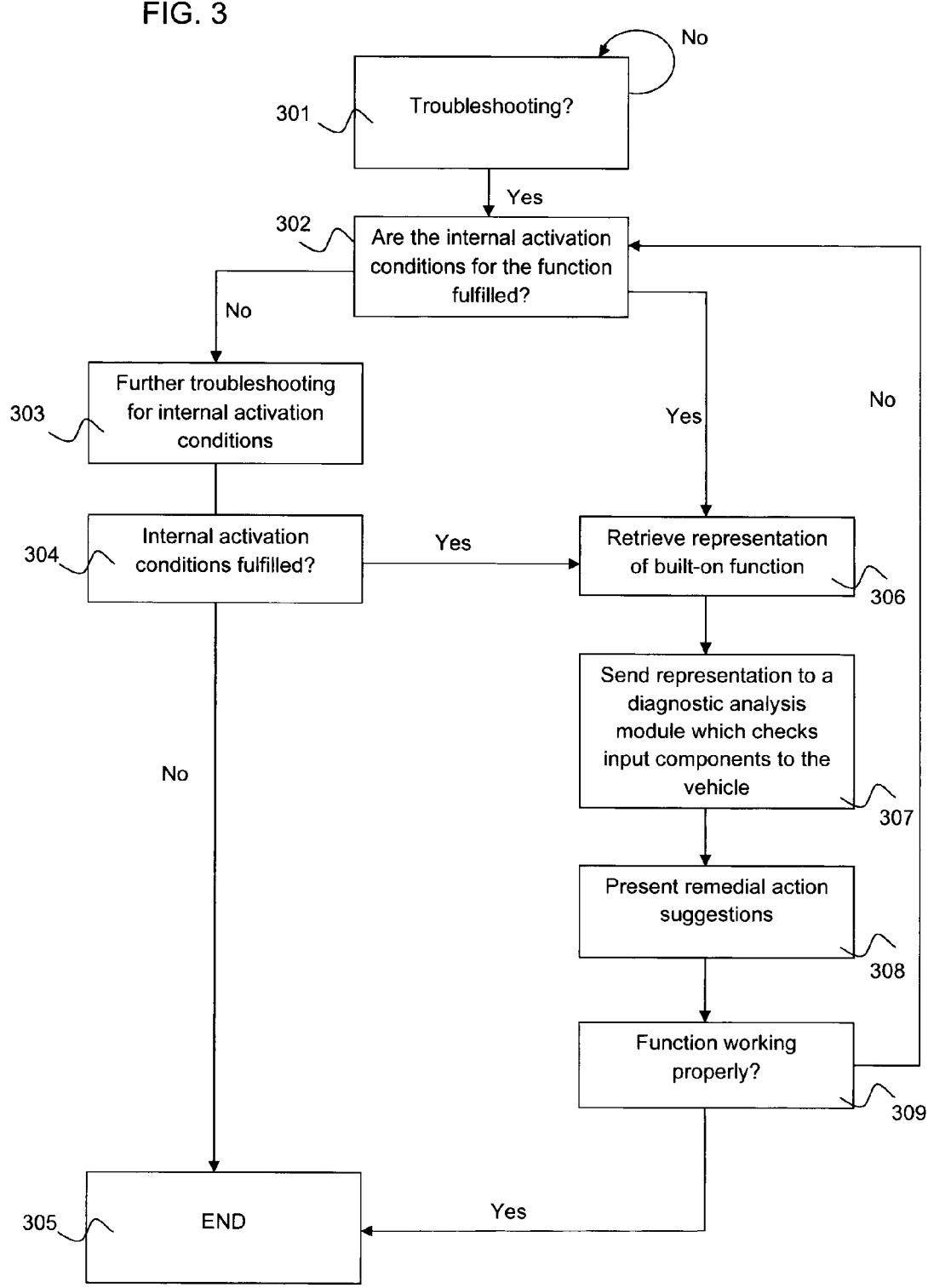
FIG. 3 depicts an embodiment example according to the present invention.

A method example according to the present invention is illustrated in FIG. 3. The method is exemplified for the built-on function depicted in FIG. 2, i.e. a torque limiter function, but with troubleshooting based on employing a function description according to the present invention. The method begins with a step 301 determining whether the power offtake function as above is to undergo troubleshooting. If such is the case, which may for example be triggered by suitable action by a workshop mechanic, the method moves on to step 302.

Step 302 determines whether the vehicle's internal conditions for allowing activation of the power offtake function are fulfilled at all. These conditions may for example require the engine to have been started and the gearbox to be in a certain position, e.g. in neutral. If the internal conditions for activation are not fulfilled, the method may move on to step 303 to troubleshoot internal activation conditions, since the power offtake function will not be activated at all, irrespective of the status of the built-on function's electrical system, if the internal activation conditions are not fulfilled. Troubleshooting of internal activation conditions may be conducted in any suitable way and is therefore not described in more detail here, since it is part of a vehicle's normal internal troubleshooting. In one embodiment, the internal activation conditions may be identified by the diagnostic tool, e.g. such information may be stored in the vehicle's control system or be accessible to the diagnostic tool. Internal activation conditions which are not fulfilled may thus be presented to the user of the diagnostic tool, making it possible to verify that they are fulfilled, e.g. that a parking brake really is activated if so required, and whether this has not been done.

After troubleshooting at step 303, the method moves on to step 304 which again determines whether the internal activation conditions for the function are fulfilled. If such is still not the case, the method ends at step 305 or reverts to step 303 for further troubleshooting. If on the contrary the troubleshooting shows that the internal conditions for activation are now fulfilled, the method moves on to step 306. It also does so in cases where it has already been determined at step 302 that the internal activation conditions for the function are fulfilled.

At step 306 a computer-readable representation of the built-on function, e.g. a program code representation, is retrieved from the built-on element's control unit 117 or some other suitable storage location on board the vehicle. This code takes the form of a computer-readable representation of the built-on function with required signals and conditions which are applicable for activation of the function. This computer-readable representation may be a function description which has for example been created with suitable computer programs. In a preferred embodiment, the program code may be generated by a program which has itself been used to create the function, as described below. Alternatively, the computer-readable representation may for example be created by the party which carries out the building-on and may follow a syntax readable by a diagnostic tool as below.

The computer-readable representation may for example be stored in the control unit 117 or some other suitable control unit on board the vehicle. Alternatively it may for example be sent to a central storage location for vehicles made by the vehicle manufacturer, enabling for example a workshop or a diagnostic tool to retrieve the computer-readable representation as necessary from the central location.

The computer-readable representation retrieved at step 306 is then read at step 307 into a diagnostic tool which analyses it and can use it to determine which signals have to be active for the built-on function to be activated. By for example setting a demand for power offtake as above to be active, the diagnostic tool can use the function description and, for example, condition programming (which is well described in prior art as "constraint programming" and may be conducted in various different ways) as a basis for determining which signals have to be active for the function to become active. If various alternatives are possible, e.g. either a parking brake signal or a service brake signal as in FIG. 2, the diagnostic tool may use condition programming to determine the various possible signal combinations which would result in an active power offtake demand. With reference to the example depicted in FIG. 2, the diagnostic tool may thus find that the parking brake or the service brake has to be active while at the same time neutral gear is engaged and the circuit-breaker is activated.

When the diagnostic tool has determined which condition or conditions are required for the desired function, it can via the connection to the vehicle read the prevailing state of signals from the vehicle's internal control system and determine therefrom whether neutral gear really is engaged and whether the parking brake or the service brake is active. Such signals are usually available via the vehicle's internal control system, making it easy for the diagnostic tool to determine whether these conditions are fulfilled. The diagnostic tool is thus connected, like a conventional diagnostic tool, in such a way that the vehicle's internal signals can be read.

In one embodiment, the way in which the built-on function is implemented is as depicted in FIG. 2, in which case not all of the signals will be accessible to the diagnostic tool, since signals such as the position of the circuit-breaker are probably not available via the internal vehicle control system. In this case it is nevertheless still possible to determine whether any of the vehicle-related signals (parking brake, service brake, neutral gear) does not fulfil the conditions. When it is found by means of the diagnostic tool that any of the activation conditions is not fulfilled, a signal is generated at step 308. It may take the form of identifying the unfulfilled activation condition, which may be presented to the user of the diagnostic tool by means of the signal generated. At step 308, if such is the case, the diagnostic tool may thus for example explicitly indicate "neutral gear not engaged" for presentation to the workshop mechanic, e.g. by viewing on a display, enabling him/her to immediately deal with/investigate the matter without any measurements at all having to be made.

In this case the mechanic may check that neutral gear really is engaged. The diagnostic tool may be adapted to demanding an indication of whether dealing with the unfulfilled activation condition, i.e. by action to cause it to be fulfilled (neutral gear to be really engaged in this case), rectifies said malfunction. It is thus possible for example to determine whether a gear sensor is malfunctioning or whether quite simply not all of the activation conditions have been fulfilled.

If the function works after remedial action has been taken, the mechanic may then indicate this at step 309 via a suitable input interface and the method will end at step 305. If the built-on function still malfunctions, the method reverts to step 302 for further determination/troubleshooting. It may for example be that more than one condition are not fulfilled, in which case the diagnostic tool may so indicate. If the malfunction continues after action to deal with an unfulfilled activation condition, it is thus possible to determine whether other conditions for activation of said built-on function are fulfilled or not, and any conditions not fulfilled may be identified for the user of the diagnostic tool to deal with.

As previously mentioned, there is in the embodiment described above no certainty that the diagnostic tool has access to all of the signals pertaining to the built-on function. In the example depicted, the built-on function does for example have no access to the status of the circuit-breaker 212. However, the circuit-breaker is described in the computer-readable representation, so the diagnostic tool may still find that it has to be active. If for example the other conditions required according to FIG. 2 are fulfilled, the diagnostic tool may at step 308 indicate that one activation condition is that the circuit-breaker be activated, which the workshop mechanic can immediately troubleshoot, potentially reducing markedly his/her troubleshooting workload.

The diagnostic tool may also raise the question of whether the circuit-breaker is activated. This may in particular be advantageous in cases where various activation conditions take the form of signals which cannot be read via signals in the vehicle's internal control system, since it means that the mechanic can, condition by condition, verify proper functioning and also indicate this to the diagnostic tool so that its subsequent suggestions for remedial measures can as far as possible be based on as much data as possible.

In cases where there are various signals which can be identified but not be read directly by it, they can therefore still be identified by the diagnostic tool and suitable troubleshooting measures can still be suggested.

The present invention thus proposes a troubleshooting method which substantially facilitates troubleshooting of a built-on function by a workshop mechanic. Troubleshooting is greatly facilitated by the vehicle being provided at build-on stage with a computer-readable representation of the built-on function's signalling connection to the vehicle. It should be noted that a built-on element may comprise a plurality and even a large number of built-on functions, in which case a computer-readable representation may be generated for each of them.

One embodiment of the present invention also proposes for use at build-on stage a tool which may be used not only to create a computer-readable representation of the built-on function but also to actually create built-on functions by means of software in order to be able wholly or largely to avoid implementing them by means of relays etc. and instead to implement them in software.

Figure 4:
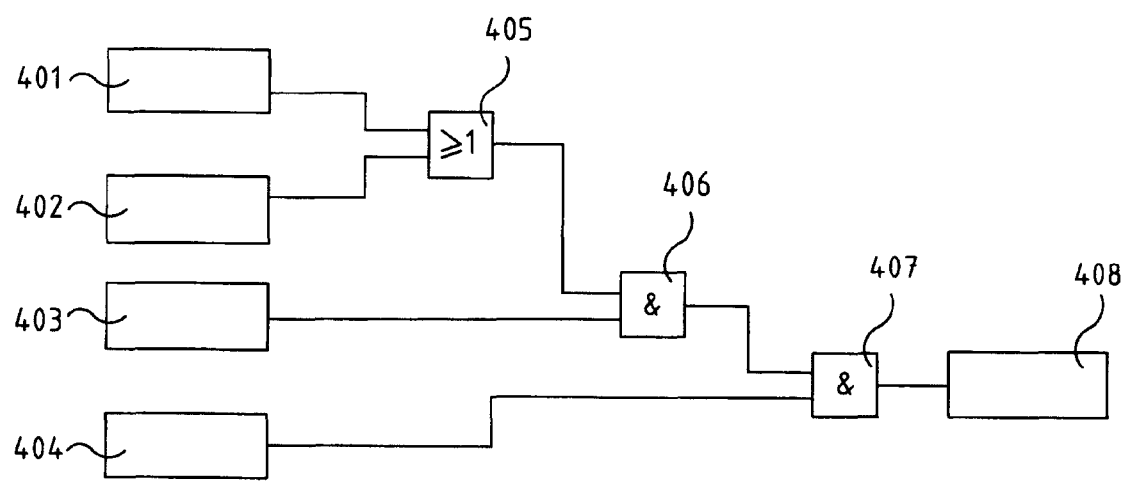
FIG. 4 depicts an example of a logic programming function according to an embodiment of the present invention.

The tool may for example take the form of a logic programming tool, making it easy to program desired functions for a user without in-depth knowledge of programming. FIG. 4 is a graphic depiction of a logical relationship corresponding functionally to the built-on function depicted in FIG. 2. Instead of the prior art method of only using signals on inputs/outputs on a built-on element's control unit to achieve desired functions, a programming tool according to the present invention makes it possible to implement the same functions with substantially less work involved in actually connecting the built-on element to the vehicle.

The tool may for example comprise a suitable choice of vehicle-internal chassis functions, status functions and operators for connecting various signals together. For example, operators such as "and", "or", "hours" etc. may be used when setting up logical relationships. This tool thus makes it possible for a built-on element to be implemented directly in software instead of by means of various signal cables, relays etc. The tool may for example be of such a kind that the user can use "drag and drop" of operators, status signals etc. and can easily connect them together by laying connecting lines between the various components.

Such a tool thus affords the advantage that very little prior knowledge of programming is required for its use, which is a great advantage.

In one solution of the kind depicted in FIG. 4, function blocks such as those numbered 401, 402, 403, 404 may be used to represent input signals which are then joined to desired functionalities by means of operators 405, 406, 407, with the possibility of indicating desired results, in this case torque-limited torque offtake 408 as above. A tool of the kind depicted in FIG. 4 thus makes it easy to implement built-on functions, with substantially reduced cabling.

In the example depicted, all of the signals except the circuit-breaker constitute vehicle-internal functions which are thus already available via the vehicle's control system, so only one signal representing the circuit-breaker has to be supplied to, for example, a built-on element's control unit to make it possible to fully implement the exemplified function.

The logical description of the function may then be converted by the programming tool to a form (syntax) which corresponds to, for use in, the vehicle's control system. The programming tool may thus be used to generate a computer-readable representation, e.g. a computer program code representing the function, and this code may be stored at a suitable location, e.g. in the built-on element's control unit in order to be executed there during operation. This computer program code may then be read in by the diagnostic tool for troubleshooting as above, in which case all of the signals, i.e. even the circuit-breaker signal, will be available for troubleshooting by the diagnostic tool, since the circuit-breaker signal is connected to the built-on element's control unit.

Alternatively, the programming tool may generate, as well as the computer program code for use during operation of the vehicle, a specific computer-readable representation of the built-on function for use by the diagnostic tool in cases where the diagnostic tool's syntax differs from that of the vehicle. It is also possible for a representation readable by the diagnostic tool to be transferred via a suitable interface to, for example, a central location for storage of vehicle data where data for each specific vehicle may be stored, which in one embodiment makes it possible for the diagnostic tool, when troubleshooting, to retrieve function descriptions from the central location. Storing the built-on function data and also other data at some other location affords the further advantage that if for example the built-on element's control unit malfunctions it can be replaced, in which case the new control unit can be reset to desired configurations by means of these data.

In cases where the built-on function is implemented by means of a programming tool, further refined troubleshooting is thus made possible in that all of the signals may be available to the diagnostic tool.

The software for generating desired functions may for example be provided by the vehicle manufacturer, in which case a syntax readable by the diagnostic tool can easily be generated by the programming tool and/or the diagnostic tool may be adapted to reading the program code as generated for use in the vehicle's control system. Alternatively, the programming tool may be provided by another party, in which case it is only necessary to ensure that the function description is provided in such a way that the diagnostic tool can make correct function diagnoses. This may be ensured by means of a defined interface to the diagnostic tool. This also applies in the above case where implementation of built-on functions is by means of relays etc., where the function description may be provided in any desired way so long as it is in a form readable by the diagnostic tool.

The programming tool for programming of built-on functions may as above display a graphic layout with function block programming. This embodiment affords the advantage of making it easy to create a visual, and hence readily comprehensible, picture of the function. In one embodiment the function may instead be programmed directly in suitable programming language. It should be noted that this calls for greater prior knowledge on the part of the user, but this embodiment may be advantageous for those who often create built-on functions and are well acquainted with programming. The invention also affords the advantage that the built-on element's control unit 117 does not need as many inputs/outputs as in prior art, since in at least certain embodiments built-on functions can largely be implemented in software instead of hardware.

The present invention is not restricted to its embodiments described above but refers to and comprises all embodiments within the protective scope of the attached claims. The invention is for example described above in terms of an example where power offtake is demanded, but, as described above, built-on functions may also be of many different kinds, e.g. illumination of lamps, warning lamps etc. Software implementation of built-on functions also has further advantages. When for example implementing a function where a warning lamp, e.g. in a driving cab, is to be illuminated, it is also possible, when implementing the function with a programming tool, to have, for example, warning texts for presentation in, for example, a display tailored to precise desired wording.

The invention claimed is:

1. A method for providing and troubleshooting at least one built-on function pertaining to a vehicle which had been produced, the method comprising:
building-on of said at least one built-on function of said vehicle onto said vehicle after production of said vehicle and providing a non-transitory computer-readable medium with a computer-readable program code representation of said at least one built-on function associated with said vehicle, said vehicle including at least one first control system, said at least one built-on function including at least one second control system, and said vehicle further including a building-on interface permitting communication between said at least one first control system and said at least one second control system, said at least one first control system sending at least one first signal to said at least one second control system, said at least one first signal indicating whether at least one first condition for activation of said at least one built-on function is fulfilled in said vehicle, said at least one second control system sending at least one second signal associated with activation of said at least one built-on function to said at least one first control system when said at least one first condition for activation of said at least one built-on function is fulfilled in said vehicle; and
when said at least one built-on function malfunctions, said method comprises:
connecting said vehicle to a diagnostic tool on which is stored said computer-readable program code representation of said at least one built-on function;
using said diagnostic tool to determine said at least one first condition for activation of said at least one built-on function based on said computer-readable program code representation of said at least one built-on function;

using said diagnostic tool, by said connection of said vehicle to said diagnostic tool, to determine whether said at least one first condition for activation of said at least one built-on function is fulfilled in said vehicle by examination of said at least one first signal; and generating a third signal if said at least one first condition for activation of said at least one built-on function is not fulfilled.

2. The method according to claim 1, wherein said activation of said built-on function requires fulfilment of a plurality of activation conditions, and generating said third signal when at least a first of said required activation conditions is not fulfilled.

3. The method according to claim 2, further comprising identifying at least said first of said required activation conditions by said third signal.

4. The method according to claim 1, further comprising identifying said at least one first condition for activation of said at least one built-on function for a user of said diagnostic tool by use of said generated third signal.

5. The method according to claim 1, further comprising:
identifying said at least one first condition for activation of said at least one built-on function which has to be fulfilled for a user of said diagnostic tool.

6. The method according to claim 5, further comprising:
when identifying said at least one first condition for activation of said at least one built-on function for a user of said diagnostic tool, using said diagnostic tool to demand an indication of whether remedial action causing fulfillment of said at least one first condition for activation of said at least one built-on function rectifies said malfunction.

7. The method according to claim 6, further comprising:
after said remedial action causing fulfillment of said at least one first condition for activation of said at least one built-on function, responding to said malfunction of said at least one built-on function by determining whether at least one second condition for activation of said at least one built-on function is fulfilled and,
identifying said at least one second condition for activation of said at least one built-on function for a user of said diagnostic tool where said at least one second condition for activation of said at least one built-on function is not fulfilled.

8. The method according to claim 1, further comprising, in said troubleshooting of said at least one built-on function, determining whether vehicle-internal conditions for activation of said at least one built-on function are fulfilled.

9. The method according to claim 1, further comprising:
determining, by using said diagnostic tool, from said computer-readable program code representation of said at least one built-on function at least one vehicle-internal condition which has to be fulfilled for said at least one built-on function to be activated; and
determining, via said connection of said diagnostic tool to said vehicle, whether said vehicle-internal condition is fulfilled by reading signals from said vehicle's internal control system.

10. The method according to claim 9, further comprising: reading said signals substantially in real time.

11. The method according to claim 1, further comprising using said computer-readable program code representation of said at least one built-on function, and applicable condition programming, to determine conditions for activation of said at least one built-on function.

12. The method according to claim 1, further comprising storing said computer-readable program code representation of said at least one built-on function on board said vehicle.

13. The method according to claim 1, further comprising generating said computer-readable program code representation of said at least one built-on function by means of a programming tool.

14. The method according to claim 1, wherein said computer-readable program code representation of said at least one built-on function comprises a representation of required signals and conditions for activation of said at least one built-on function.

15. The method according to claim 1, wherein said computer-readable program code representation of said at least one built-on function takes the form of a logic function description of said at least one built-on function.

16. The method according to claim 1, further comprising creating said at least one built-on function by means of a programming tool.

17. The method according to claim 16, wherein said programming tool for creating said at least one built-on function generates said computer-readable program code representation of said at least one built-on function.

18. The method according to claim 1, further comprising creating said at least one built-on function by means of a programming tool which creates a graphic function description of said at least one built-on function and which converts said function description to a computer-readable program code representation of said function description.

19. The method according to claim 1, wherein said at least one built-on function has been built on by some other party than a producer of said vehicle.

20. A diagnostic tool for troubleshooting at least one built-on function pertaining to a vehicle which had been produced, and said vehicle undergoes building-on, after production of said vehicle, of said at least one built-on function which is provided with a computer-readable program code representation associated with said vehicle, the computer-readable program code representation being provided on a non-transitory computer-readable medium, said vehicle including at least one first control system, said at least one built-on function including at least one second control system, and said vehicle further including a building-on interface permitting communication between said at least one first control system and said at least one second control system, said at least one first control system sending at least one first signal to said at least one second control system, said at least one first signal indicating whether at least one first condition for activation of said at least one built-on function is fulfilled in said vehicle, said at least one second control system sending at least one second signal associated with activation of said at least one built-on function to said at least one first control system when said at least one first condition for activation of said at least one built-on function is fulfilled in said vehicle, said computer-readable program code representation of said at least one built-on function being stored on said diagnostic tool;

wherein during troubleshooting of said at least one built-on function and when said vehicle has been connected to said diagnostic tool, said diagnostic tool is configured for;

on a basis of said computer-readable program code representation of said at least one built-on function, determining said at least one first condition for activation of said at least one built-on function;

via said connection to said vehicle, determining whether said at least one first condition for activation of said at least one built-on function is fulfilled in said vehicle by examination of said at least one first signal; and generating a third signal if said at least one first condition for activation of said at least one built-on function is not fulfilled.

21. A computer program comprising program code, stored on a non-transitory computer-readable medium, wherein when said program code is executed in a diagnostic tool connected to a vehicle, said computer program causing said diagnostic tool to:

determine at least one first condition for activation of at least one built-on function of said vehicle based on a computer-readable program code representation of said at least one built-on function stored on a non-transitory computer-readable medium, said vehicle including at least one first control system, said at least one built-on function including at least one second control system, and said vehicle further including a building-on interface permitting communication between said at least one first control system and said at least one second control system, said at least one first control system sending at least one first signal to said at least one second control system, said at least one first signal indicating whether said at least one first condition for activation of said at least one built-on function is fulfilled in said vehicle, said at least one second control system sending at least one second signal associated with activation of said at least one built-on function to said at least one first control system when said at least one first condition for activation of said at least one built-on function is fulfilled in said vehicle; and determine, by connection of said vehicle to said diagnostic tool, whether said at least one first condition for activation of said at least one built-on function is fulfilled in said vehicle by examination of said at least one first signal, said at least one built-on function of said vehicle being built on said vehicle after production of said vehicle.

22. A vehicle which had been produced and has undergone building-on of at least one built-on function, after production of said vehicle, said vehicle comprising a computer-readable program code representation of said at least one built-on function stored on a non-transitory computer-readable medium, said vehicle including at least one first control system, said at least one built-on function including at least one second control system, and said vehicle further including a building-on interface permitting communication between said at least one first control system and said at least one second control system, said at least one first control system sending at least one first signal to said at least one second control system, said at least one first signal indicating whether at least one first condition for activation of said at least one built-on function is fulfilled in said vehicle, said at least one second control system sending at least one second signal associated with activation of said at least one built-on function to said at least one first control system when said at least one first condition for activation of said at least one built-on function is fulfilled in said vehicle; said representation being configured so that a diagnostic tool connected to said vehicle for troubleshooting may use said representation to determine whether said at least one first condition for activation of said at least one built-on function is fulfilled in said vehicle by examination of said at least one first signal.

* * * * *